United States Patent [19]
Matthews et al.

[11] Patent Number: 5,402,226
[45] Date of Patent: Mar. 28, 1995

[54] SURVEY APPARATUS

[76] Inventors: Jeffrey M. Matthews, 1114 Paloma Ave., #1, Burlingame, Calif. 94101; Adam C. Matthews, 204 Ames Port Landing, Half Moon Bay, Calif. 94019; Gary L. Benjamin, 3015 Hillside Dr., Burlingame, Calif. 94010

[21] Appl. No.: 61,258

[22] Filed: May 17, 1993

[51] Int. Cl.[6] .................. G01B 11/26; G01C 1/00
[52] U.S. Cl. ................. 356/141.3; 33/261; 33/285; 33/286; 356/138; 356/139; 356/139.03; 356/142
[58] Field of Search ............ 356/138, 139, 142, 141.3, 356/153, 139.03; 33/261, 285, 286

[56] References Cited
U.S. PATENT DOCUMENTS 3,762,820 10/1973 Zoot et al. .
4,208,801 6/1980 Blair .................................. 33/281

Primary Examiner—Stephen C. Buczinski
Attorney, Agent, or Firm—E. Michael Combs

[57] ABSTRACT

The apparatus of the invention is arranged to include facing table members, each having first and second pivotally mounted table plates relative to each table member to accommodate orientation of the tables with leveling and compass structure mounted to each table to enhance alignment. A sighting structure is arranged to include a light emitting housing to provide for alignment between the tables, as well as a range finder structure arranged to indicate spacing between the tables.

4 Claims, 4 Drawing Sheets

SURVEY APPARATUS

BACKGROUND OF THE INVENTION

1. Field of the Invention

The field of invention relates to survey apparatus, and more particularly pertains to a new and improved survey apparatus wherein the same is arranged to cooperate relative to one another over spatial distances.

2. Description of the Prior Art

Range finder structure is available in the prior art as indicated in U.S. Pat. Nos. 3,634,011 and 4,531,833.

The instant invention is arranged to include a survey apparatus to provide for enhanced range finding and alignment between tables of the instant invention and in this respect, the present invention substantially fulfills this need.

SUMMARY OF THE INVENTION

In view of the foregoing disadvantages inherent in the known types of survey apparatus now present in the prior art, the present invention provides a survey apparatus including range finding and location indicating structure between spaced table assemblies. As such, the general purpose of the present invention, which will be described subsequently in greater detail, is to provide a new and improved survey apparatus which has all the advantages of the prior art survey apparatus and none of the disadvantages.

To attain this, the present invention provides an apparatus arranged to include facing table members, each having first and second pivotally mounted table plates relative to each table member to accommodate orientation of the tables with leveling and compass structure mounted to each table to enhance alignment. A sighting structure is arranged to include a light emitting housing to provide for alignment between the tables, as well as a range finder structure arranged to indicate spacing between the tables.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved survey apparatus which has all the advantages of the prior art survey apparatus and none of the disadvantages.

It is another object of the present invention to provide a new and improved survey apparatus which may be easily and efficiently manufactured and marketed.

It is a further object of the present invention to provide a new and improved survey apparatus which is of a durable and reliable construction.

An even further object of the present invention is to provide a new and improved survey apparatus which is susceptible of a low cost of manufacture with regard to both materials and labor, and which accordingly is then susceptible of low prices of sale to the consuming public, thereby making such survey apparatus economically available to the buying public.

Still yet another object of the present invention is to provide a new and improved survey apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
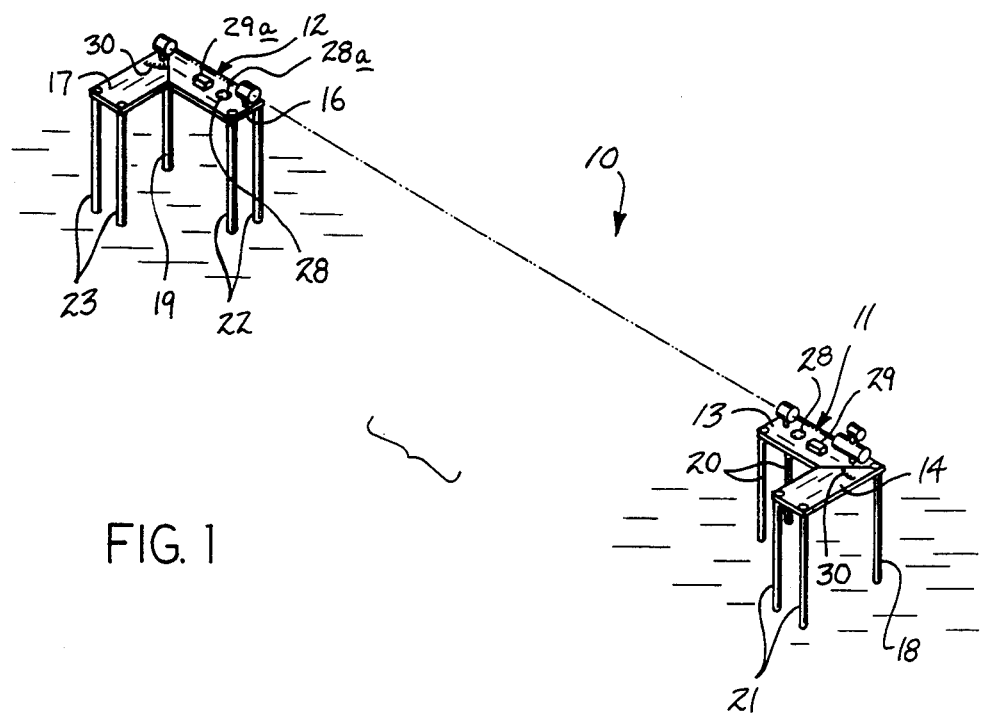
FIG. 1 is an isometric illustration of the invention.

With reference now to the drawings, and in particular to FIGS. 1 to 8 thereof, a new and improved survey apparatus embodying the principles and concepts of the present invention and generally designated by the reference numeral 10 will be described.

Figure 2:
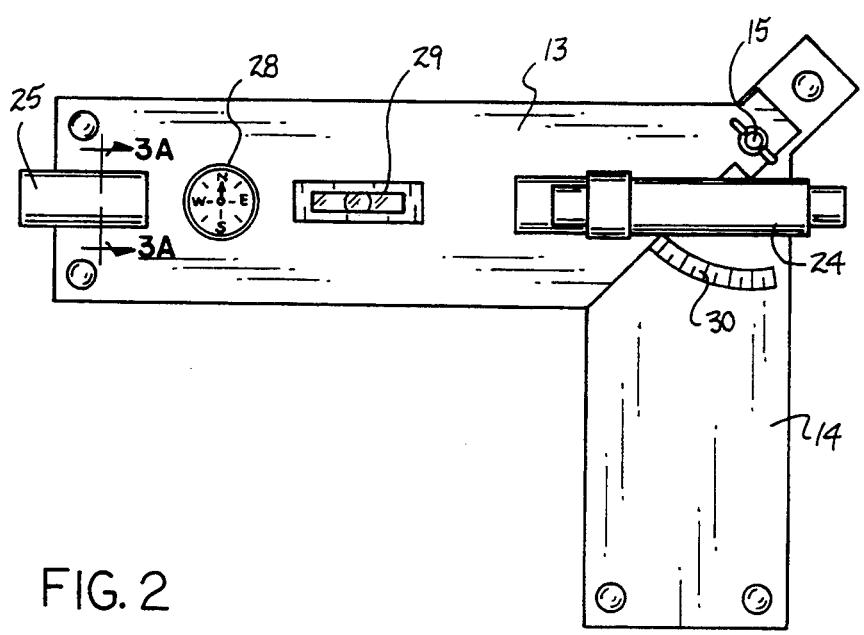
FIG. 2 is an orthographic top view of the first table assembly.
Figure 3:
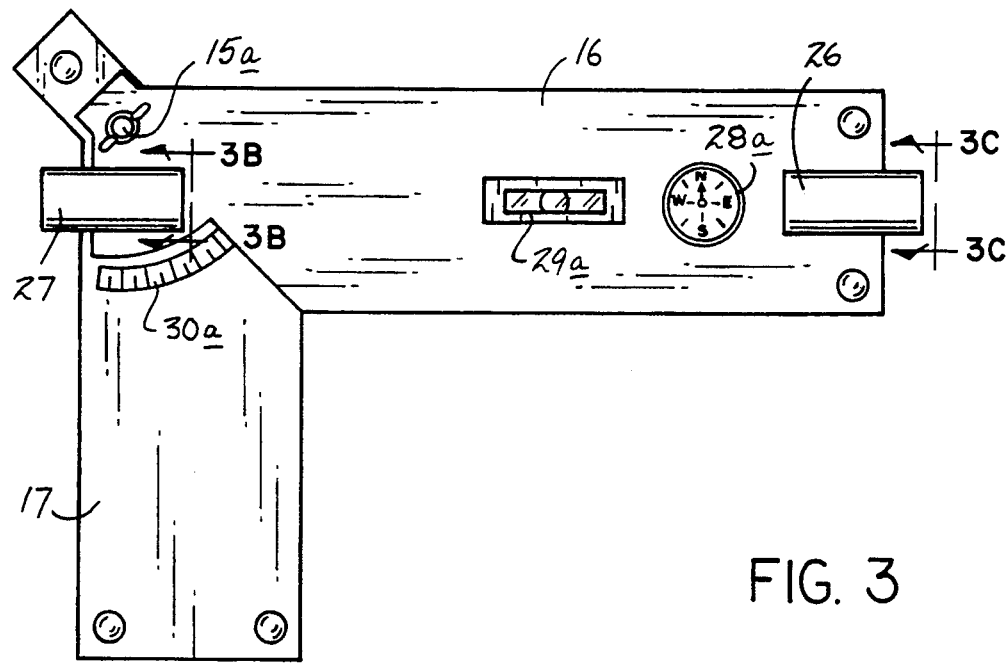
FIG. 3 is an orthographic view of the second table assembly.
Figures 3A, 3B, 3C:
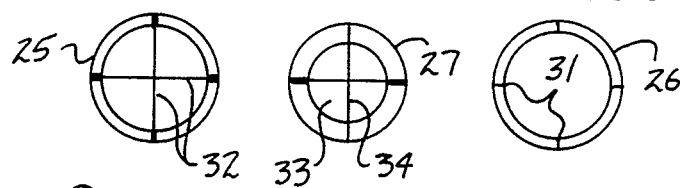
FIG. 3a is an orthographic view, taken along the lines 3a—3a of FIG. 2 in the direction indicated by the arrows.
FIG. 3b is an orthographic view, taken along the lines 3b—3b of FIG. 3 in the direction indicated by the arrows.
FIG. 3c is an orthographic view, taken along the lines 3c—3c of FIG. 3 in the direction indicated by the arrows.
Figure 4:
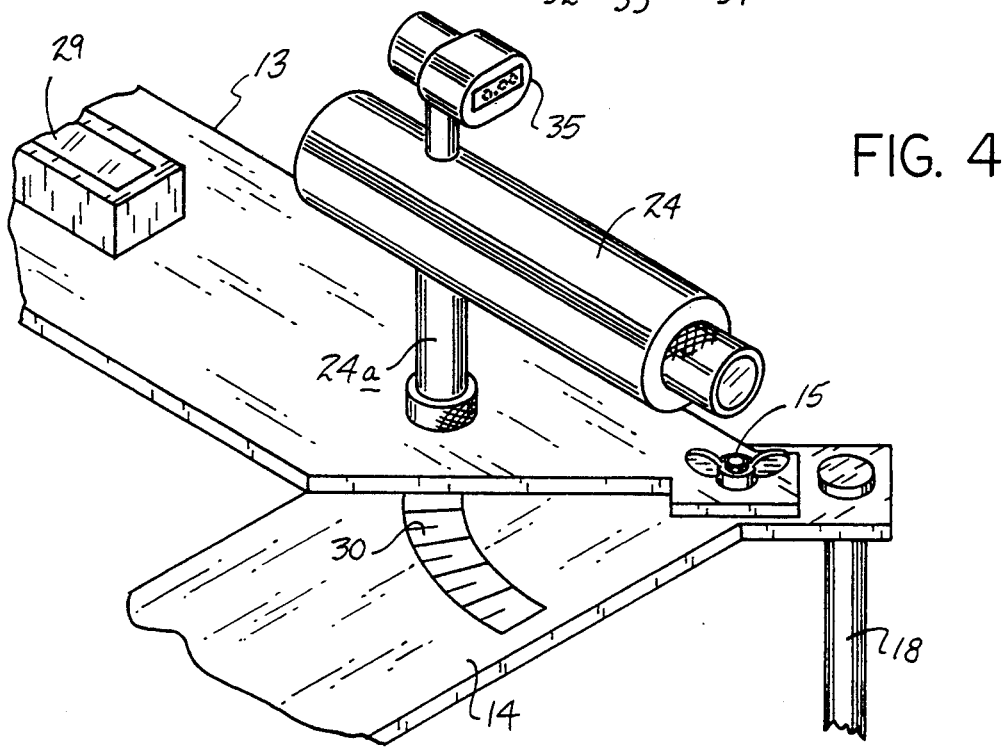
FIG. 4 is an isometric illustration of the first table assembly having a range finder structure mounted thereon.
Figure 5:
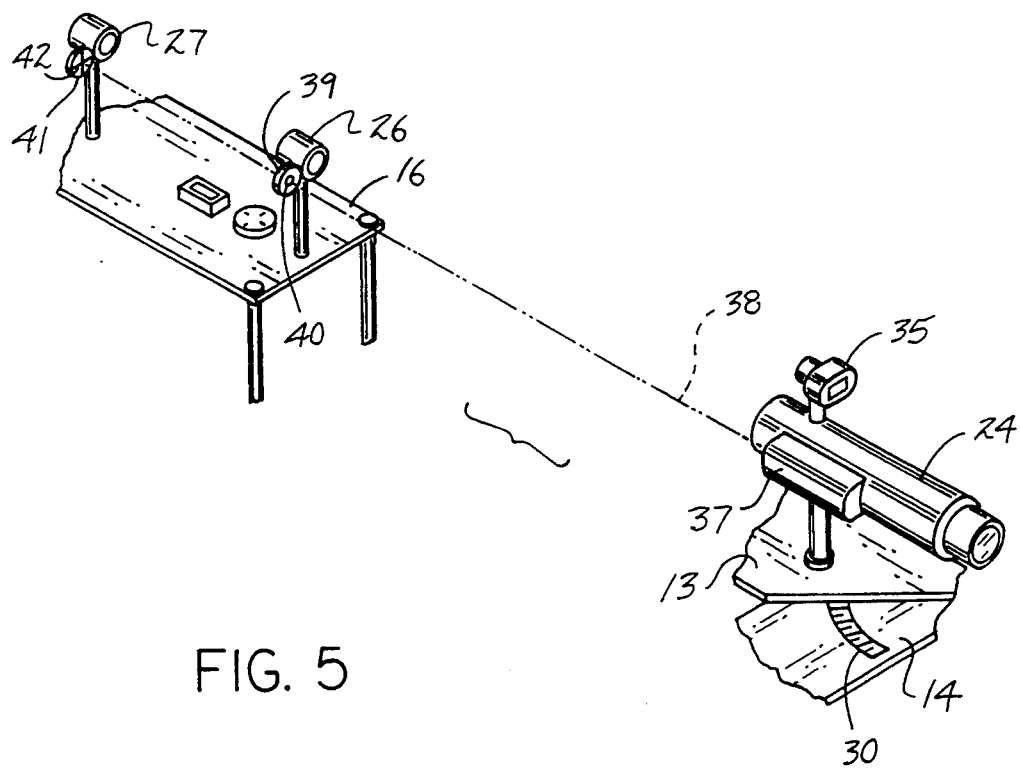
FIG. 5 is an isometric illustration of the light emitting housing structure mounted to the sighting tube housing.
Figure 6:
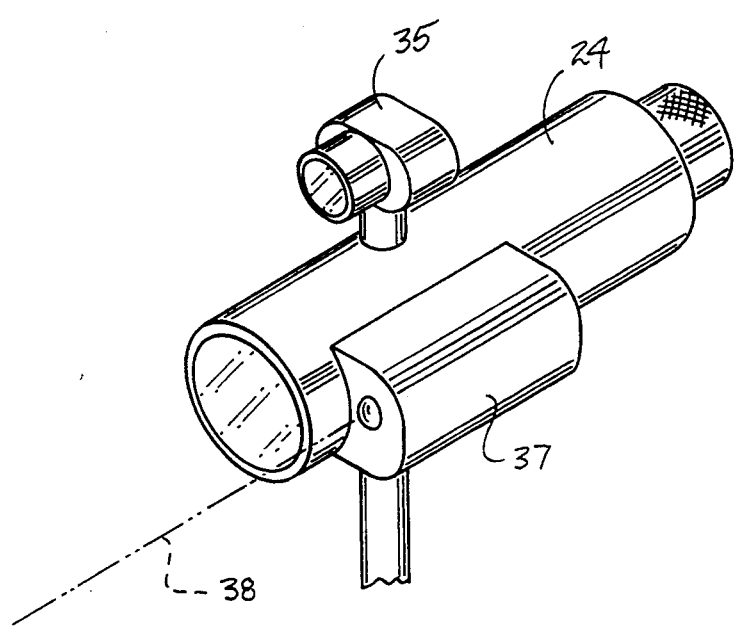
FIG. 6 is a frontal isometric illustration of a sighting tube structure.
Figure 7:
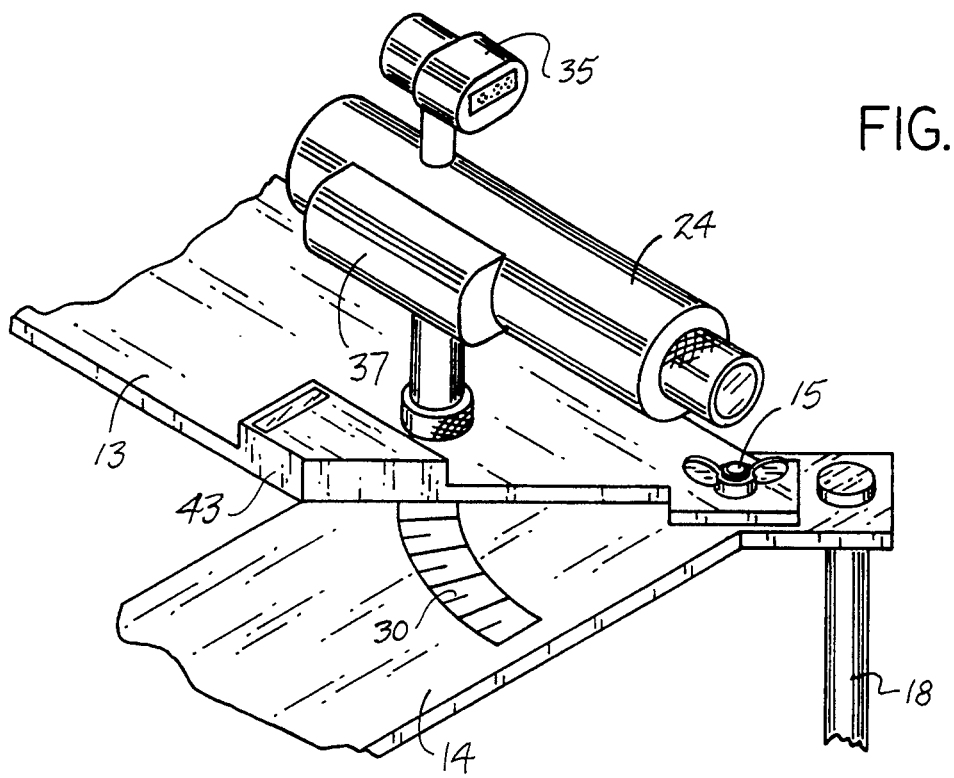
FIG. 7 is an isometric illustration of the invention including illustration of the angulation measuring structure.
Figure 8:
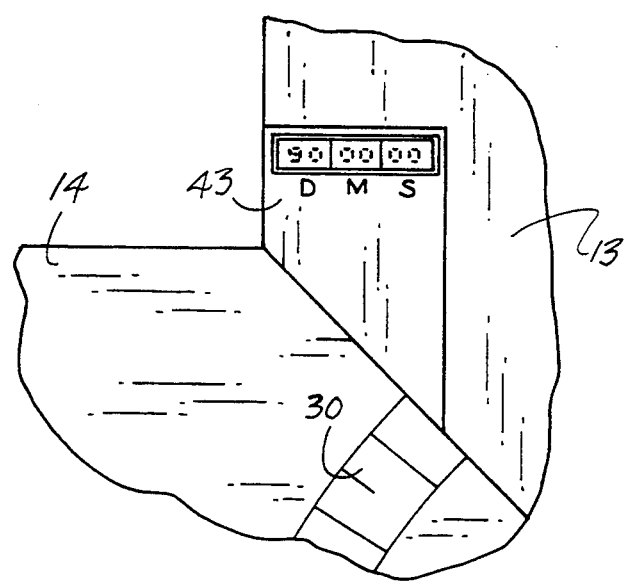
FIG. 8 is an orthographic top view of the angulation measuring structure, as indicated in FIG. 7.

More specifically, the survey apparatus 10 of the instant invention essentially comprises a first table assembly 11 cooperative with a second table assembly 12 to provide for alignment between the tables in a range finding and alignment orientation relative to one another. To this end, the first table assembly 11 includes a first table first plate 13 pivotally mounted to a first table second plate 14 about a first axle is, with a second table first plate 16 pivotally mounted relative to a second table second plate 17 about a second axle 15a (see FIG. 3). A first axle leg 18 is mounted in parallel adjacency relative to the first axle 15, with a second axle leg 19 mounted in parallel adjacency relative to the second axle 15a, such that first legs 20 are orthogonally mounted to the first table first plate 13, with second legs 21 orthogonally mounted to the first table second plate 14. Threaded legs 22 are orthogonally mounted to the second table first plate 16, with fourth legs 23 orthogonally mounted to the second table second plate 17. As the first table first plate and the second table first plate 13 and 16 respectively are arranged for alignment relative to one another, and are to be leveled employing respective first and second spirit levels 29 and 29a (see FIGS. 2 and 3 respectively), the first through fourth legs may be provided with adjustment of various types such as telescoping, threaded inter-engagement, and the like, in a manner known in the prior art and believed to be available in the prior art to one requiring such adjusting ability. Further, the first table first plate 13 and the second table first plate 16 are provided respectively with first and second compass members 28 and 28a respectively, as illustrated in FIGS. 2 and 3 respectively. A sighting scope 24 is mounted to the first table first plate 13, with a sighting scope 24 mounted in longitudinal alignment on the first table first plate for sighting through the first sight tube, that includes the sight tube orthogonally intersecting cross hairs 32 to assist in alignment, with a second sight tube 26 mounted to the second table first plate for alignment with a third sight tube 27. The second sight tube 26 includes second tube guide indicia 31 oriented within the second sight tube at ninety degree intervals, with the third sight tube 27 including a third tube mirror end wall 33 having orthogonally intersecting third tube cross hairs 34, such as indicated in the FIG. 3b. In this manner, longitudinal alignment of the sighting scope 24 is directed for aligning the first table first plate with the second table first plate. It should be noted that the sighting scope 24 is arranged for pivotal mounting orthogonally relative about a sight scope support shaft 24a that in turn is pivotally mounted orthogonally relative to the first table first plate. A digital range finder 35 may be optionally employed by the sighting scope, in a manner as indicated in FIG. 4, of a type as exemplified in the U.S. Pat. No. 4,531,833 incorporated herein by reference. To this end, a laser emitter housing 37 is mounted to the sighting scope (see FIG. 6) directing a laser beam 38 that is arranged to effect alignment with a guide plate 39 mounted to the second plate tube 26, with the guide plate 39 having a guide plate aperture 40 to provide visible alignment with a target plate 41, that in turn is mounted to the third sight tube 27. The target plate 41 includes target plate cross hair intersection 42 to receive the laser beam 38 to further enhance alignment of the first table first plate with the second table first plate. The first table second plate 4 and the second table second plate 17 are provided with respective first and second arcuate scales 30 and 30a respectively that are concentric with the respective first and second axles 15 and 15a respectively to provide for measuring angular orientation of the first table second plate and the second table second plate relative to the respective first table first plate and the second table first plate in measuring angular orientations within a room and the like when directing orthogonal angulations. If desired, a digital indicator member 43 may be mounted relative to the first table first plate and the second table first plate for providing visual indication of angular measurement with respective tail plates within a respective table assembly.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in tile specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A survey apparatus, comprising, a first table assembly in a spaced relationship relative to a second table assembly, the first table assembly having a first table first plate and a first table second plate,
and
a first axle pivotally mounting the first table first plate to the first table second plate,
and
the second table assembly including a second table first plate and a second table second plate, with a second axle pivotally mounting the second table first plate to the second table second plate,
and
the first table first plate including at least one first leg,
and
the first table second plate including at least one second leg,
and
the first table assembly including a first axle leg arranged in spaced adjacency to the first axle, and the second table first plate having at least one third leg, the second table second plate having at least one fourth leg, and a second axle leg mounted in spaced parallel adjacency to the second axle, with a sighting scope mounted upon the first table first plate, a first sight tube mounted upon the first table first plate spaced from the sighting scope, the second table first plate having a second sight tube, and the second table first plate including a third sight tube, with the second sight tube and the third sight tube coaxially aligned relative to one another, with the sighting scope, the first sight tube, the second sight tube, and the third sight tube arranged for coaxial alignment with the sighting scope arranged for pivotal mounting relative to the first table first plate.

2. An apparatus as set forth in claim 1 including a light emitting housing mounted to the sighting scope, with the second sight tube including a guide plate, the guide plate including a guide plate aperture, with a target plate mounted to the third sight tube, with the target plate having a cross hair intersection for aligning a light beam from the light emitting housing directed through the guide plate aperture onto the target plate.

3. An apparatus as set forth in claim 2 wherein the first sight tube includes a first tube cross hair intersection, the second sight tube includes a plurality of second tube guide indicia spaced ninety degrees relative to one another within the second sight tube, and the third sight tube includes a third tube mirror end wall having a third tube cross hair intersection for alignment with the sighting scope through the second sight tube and the first sight tube.

4. An apparatus as set forth in claim 3 wherein the first table second plate includes a first arcuate scale concentric with the first axle, and the second table first plate includes a second arcuate scale concentric with the second axle for measuring angularity of the second table second plate relative to the second table first plate, with the first arcuate scale arranged for measuring angular orientation of the first table first plate to the first table second plate.

* * * * *